United States Patent
Elliott

(10) Patent No.: US 9,377,076 B2
(45) Date of Patent: Jun. 28, 2016

(54) MAGNETO-RHEOLOGICAL DAMPING SYSTEM FOR PREVENTING STRATIFICATION

(71) Applicant: Caterpillar Inc., Peoria, IL (US)

(72) Inventor: Christopher M. Elliott, Apex, NC (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 14/622,959

(22) Filed: Feb. 16, 2015

(65) Prior Publication Data

US 2015/0159728 A1 Jun. 11, 2015

(51) Int. Cl.
*F16F 9/53* (2006.01)
*F16F 13/30* (2006.01)

(52) U.S. Cl.
CPC ............... *F16F 9/535* (2013.01); *F16F 9/537* (2013.01); *F16F 13/305* (2013.01); *F16F 2224/045* (2013.01)

(58) Field of Classification Search
CPC ............ F16F 9/32; F16F 9/535; F16F 9/537; F16F 2224/045; F16F 13/305
See application file for complete search history.

(56) References Cited

U.S. PATENT DOCUMENTS

| | | | | |
|---|---|---|---|---|
| 3,225,870 A * | 12/1965 | Heckethorn | ............ | F16F 9/185 188/269 |
| 4,877,222 A * | 10/1989 | Davis | ................... | B60G 11/265 188/274 |
| 5,018,606 A * | 5/1991 | Carlson | ................... | F16F 9/532 188/267.1 |
| 6,427,813 B1 | 8/2002 | Carlson | | |
| 6,853,263 B2 | 2/2005 | Brown et al. | | |
| 6,913,127 B2 * | 7/2005 | Holiviers | ................ | F16F 9/062 188/315 |
| 6,974,002 B2 * | 12/2005 | Heideman | ............... | F16F 9/346 188/285 |
| 7,225,905 B2 * | 6/2007 | Namuduri | ............... | F16F 9/535 188/267.1 |
| 7,644,641 B2 | 1/2010 | Mototani et al. | | |
| 7,958,979 B2 * | 6/2011 | Sekiya | ................... | B60G 17/06 188/267 |
| 8,016,479 B2 | 9/2011 | Imai et al. | | |
| 2011/0100932 A1 | 5/2011 | Lonnqvist et al. | | |
| 2013/0037362 A1 * | 2/2013 | Gartner | ................. | F16F 7/1034 188/378 |

FOREIGN PATENT DOCUMENTS

| CN | 2496697 | 6/2002 |
|---|---|---|
| CN | 102937158 | 2/2013 |
| KR | 20010108014 | 12/2001 |

* cited by examiner

*Primary Examiner* — Thomas Irvin

(57) ABSTRACT

A magneto-rheological (MR) damping system for preventing stratification of MR fluid is disclosed. The MR damping system has a housing, a piston, and a stir band. The piston operably reciprocates within the housing and includes a circumferential portion. The circumferential portion has a groove. The stir band is disposed in the groove of the piston and includes an outer periphery and a plurality of flexible protrusions. The flexible protrusions have a head portion and a tail portion. The head portion is fixed to the outer periphery. The tail portion extends from the head portion and is disjointed from the outer periphery and is substantially flexible relative to the head portion. Therefore, the stir band diverts a flow of MR fluid in one of a clockwise or a counter-clockwise direction about the circumferential portion of the piston, during a reciprocatory movement of the piston.

1 Claim, 6 Drawing Sheets

MAGNETO-RHEOLOGICAL DAMPING SYSTEM FOR PREVENTING STRATIFICATION

TECHNICAL FIELD

The present disclosure relates generally to a magneto-rheological damping system. More specifically, the present disclosure relates to a magneto-rheological damping system that prevents stratification.

BACKGROUND

Machines, such as track-type loaders, are equipped with numerous mechanical arrangements, such as but not limited to, a joystick arrangement, a pedal arrangement, and/or, a seat suspension arrangement. These mechanical arrangements commonly employ a damping system that suitably dampens a mechanical force applied to the mechanical arrangements. Several damping systems are known in the art to provide a damping action. One such damping system may be a magneto-rheological (MR) damping system.

The MR damping systems generally include a housing filled with MR fluid, within which a piston reciprocates due to the mechanical force. During reciprocatory movement of the piston, MR fluid flows axially along a circumferential portion of the piston in a direction opposite to direction of movement of the piston. This flow of MR fluid may provide a viscous drag force (damping force) along the circumferential portion of the piston and facilitates the damping action. Notably, the MR fluid is a mixture of a base fluid with suspended ferrous particles and is responsible for electronic control of the damping forces applied to the piston. In conventional MR damping systems, the flow of MR fluid is unidirectional (in an axial direction) and therefore the ferrous particles tend to settle in the base fluid of the MR fluid. This process of settlement of ferrous particles in the base fluid is termed as "stratification". Stratification of the MR fluid results in poor control of the damping forces. This results in a substantially degraded damping action.

Chinese patent 1,02,937,158 discloses a ferro-fluid based damper device (MR damping system) that includes a piston component that rotates as well as reciprocates linearly to prevent stratification of the ferro-fluid (MR fluid). Although, this reference discloses the damping system that prevents stratification by a rotation of the piston, however there remains room for simplifying stratification prevention in MR damping system.

SUMMARY OF THE INVENTION

Various aspects of the present disclosure are directed towards a magneto-rheological (MR) damping system for preventing stratification of MR fluid. The MR damping system includes a housing, a piston, and a stir band. The piston is structured and arranged to operably reciprocate within the housing. The piston includes a circumferential portion. The circumferential portion has a groove. The stir band is disposed in the groove of the piston and includes an outer periphery and a plurality of flexible protrusions. The flexible protrusions include a head portion and a tail portion. The head portion is fixedly attached to the outer periphery of the stir band. The tail portion extends from the head portion, disjointed from the outer periphery of the stir band, and is substantially flexible relative to the head portion. Therefore, during a reciprocated movement of the piston, the stir band diverts the flow of MR fluid in one of a clockwise or a counter-clockwise direction about the circumferential portion of the piston.

DETAILED DESCRIPTION

Figure 1:
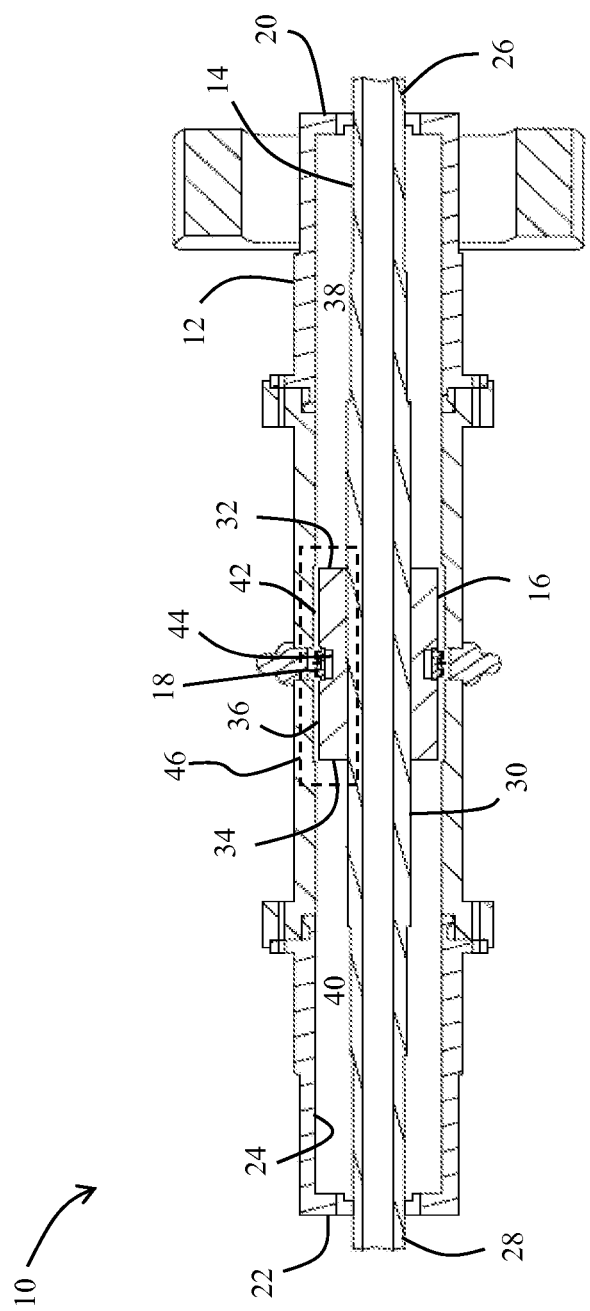
FIG. 1 is a cross-sectional side view of a magneto-rheological (MR) damping system, in accordance with the concepts of the present disclosure.

Referring to FIG. 1, there is shown a magneto-rheological (MR) damping system 10 for a mechanical arrangement (not shown). The mechanical arrangement (not shown) may include, but is not limited to, a joystick arrangement, a pedal arrangement, and/or, a seat suspension arrangement. As is customarily known, the mechanical arrangement (not shown) is subject to a mechanical force (generally vibrational force), during operation. For example, the seat suspension arrangement may be subject to a mechanical force of the weight of a person occupying the seat of the seat suspension arrangement. The MR damping system 10 is employed to provide a damping force against the mechanical force applied to the mechanical arrangement (not shown). The MR damping system 10 includes a housing 12, a shaft 14, a piston 16, and a stir band 18.

The housing 12 may be a multi-part cover assembly that houses the shaft 14 and the piston 16 of the MR damping system 10. The housing 12 is at least partially filled with MR fluid and includes a first end portion 20, a second end portion 22, and an inner periphery 24. The first end portion 20 and the second end portion 22 are adapted to slideably support the shaft 14 along a longitudinal axis X-X.

The shaft 14 may be an elongated member that includes a first end section 26, a second end section 28, and a peripheral section 30. The shaft 14 is slideably supported in the housing 12 along the first end section 26 and the second end section 28. In an embodiment, the first end section 26 of the shaft 14 extends at least partially outward from the housing 12, and may subject to the mechanical force. Notably, application of the mechanical force along the first end section 26 of the shaft 14 result in a reciprocatory movement of the shaft 14 within the housing 12.

The piston 16 may be a hollow cylinder circumferentially attached to the peripheral section 30 of the shaft 14. The piston 16 includes a first end 32, a second end 34, and a circumferential portion 36. An assembly of the piston 16 with the shaft 14 defines a first fluid space 38, a second fluid space 40, and a clearance space 42, within the housing 12. The first fluid space 38 is defined between the first end 32 of the piston 16 and the first end portion 20 of the housing 12. The second fluid space 40 is defined between the second end 34 of the piston 16 and the second end portion 22 of the housing 12. The clearance space 42 is defined between the circumferential portion 36 of the piston 16 and the inner periphery 24 of the housing 12. Furthermore, the piston 16 is adapted to reciprocate along with the shaft 14 and within the housing 12, when the shaft 14 is applied with the mechanical force. Corresponding to reciprocatory movement of the piston 16, MR fluid flows between the first fluid space 38 and the second fluid space 40 through the clearance space 42. This flow of MR fluid through the clearance space 42 may apply a viscous drag force (damping force) along the circumferential portion 36 of the piston 16 and facilitate the damping action. The piston 16 may support an electro-magnet (not shown) that may generate a magnetic field through the MR fluid to control the damping force provided by the MR damping system 10. In addition, the circumferential portion 36 of the piston 16 includes a groove 44 that supports the stir band 18 of the MR damping system 10 to prevent stratification of the MR fluid.

Figure 2:
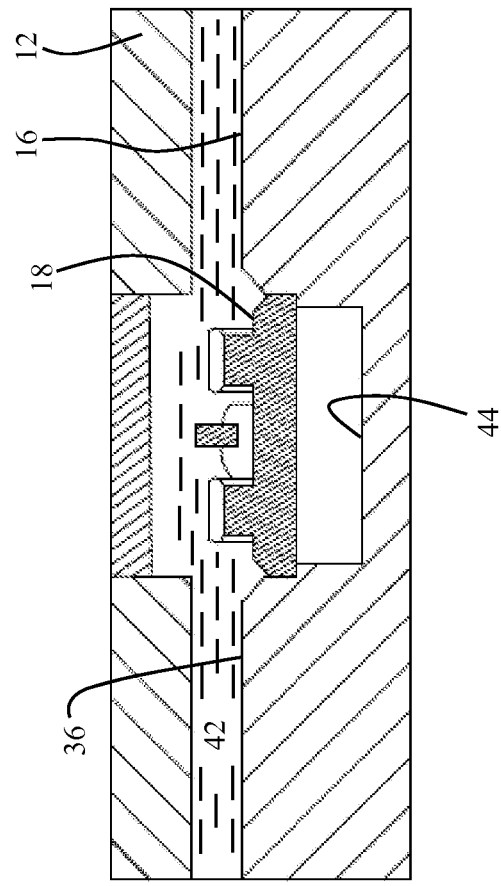
FIG. 2 is an enlarged view of a portion of the MR damping system of FIG. 1 that illustrates a stir band to prevent stratification of MR fluid, in accordance with the concepts of the present disclosure.

Referring to FIG. 2, there is shown an enlarged view of a portion 46 of the MR damping system 10 that illustrates positioning of the stir band 18 relative to the piston 16 of the MR damping system 10. The stir band 18 is positioned in the groove 44 of the piston 16 and is adapted to divert the flow of MR fluid in one of a clockwise direction and a counter-clockwise direction, to prevent stratification. The stir band 18 may be secured and positioned in the groove 44 of the piston 16 by any known attachment means, such as but not limited to, a weld attachment, an adhesive attachment, and/or a fit attachment. Although in the present disclosure, the stir band 18 is depicted as a separate component relative to the piston 16, it may be contemplated that the stir band 18 may be an integral component relative to the piston 16 of the MR damping system 10.

Figure 3:
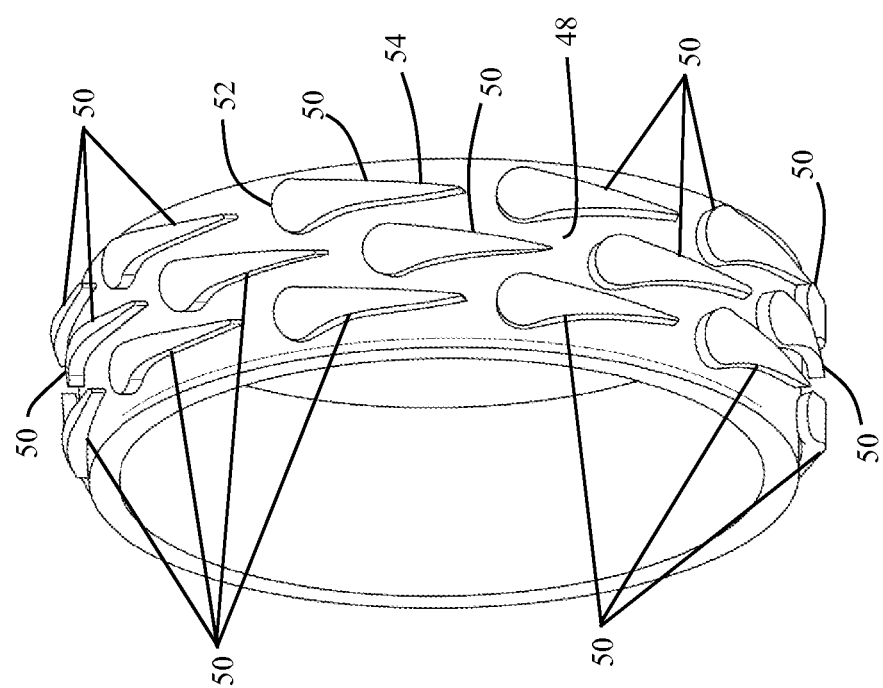
FIG. 3 is a perspective view of the stir band of FIG. 2 that illustrates flexible protrusions defined on an outer periphery of the stir band, in accordance with the concepts of the present disclosure.
Figure 4:
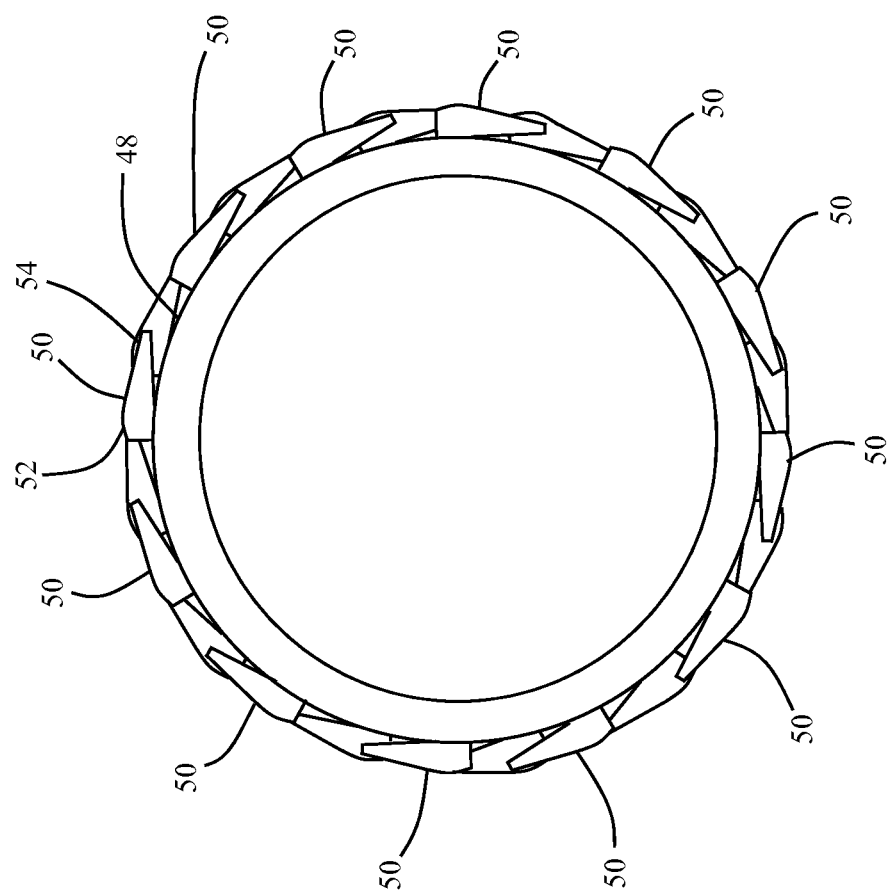
FIG. 4 is a side view of the stir band of FIG. 2 that illustrates the structure and arrangement of the flexible protrusions relative to the outer periphery of the stir band, in accordance with the concepts of the present disclosure.

Referring to FIG. 3, there is shown a perspective view of the stir band 18. The stir band 18 includes an outer periphery 48 and a plurality of flexible protrusions 50. The flexible protrusions 50 are uniformly distributed and attached along the entire outer periphery 48 of the stir band 18. The flexible protrusions 50 may be a teardrop-shaped structure that includes a head portion 52 and a tail portion 54. The head portion 52 is attached to the outer periphery 48 of the stir band 18 and the tail portion 54 is disjointed from the outer periphery 48 (as shown in FIG. 4). Although the present disclosure describes the flexible protrusions 50 with teardrop-shaped structure, it may be contemplated that the flexible protrusions 50 may be of any shape with one end fixed to the outer periphery 48 and the other end disjointed from the outer periphery 48.

Referring to FIG. 4, there is shown a side view of the stir band 18 that depicts the attachment of the flexible protrusions 50 relative to the outer periphery 48 of the stir band 18. As mentioned above, the head portion 52 is attached to the outer periphery 48 and the tail portion 54 is disjointed from the outer periphery 48 of the stir band 18. Therefore, the tail portion 54 is substantially flexible relative to the head portion 52. In the current embodiment, as shown in FIG. 1, the stir band 18 is positioned in the groove 44 of the piston 16 so that the tail portion 54 leads the head portion 52 in the clockwise direction (when viewed from the second end portion 22 along the longitudinal axis X-X). In an alternate embodiment, as shown in FIG. 1, the stir band 18 is positioned in the groove 44 of the piston 16 so that the tail portion 54 leads the head portion 52 in the counter-clockwise direction (when viewed from the second end portion 22 along the longitudinal axis X-X).

Figure 5:
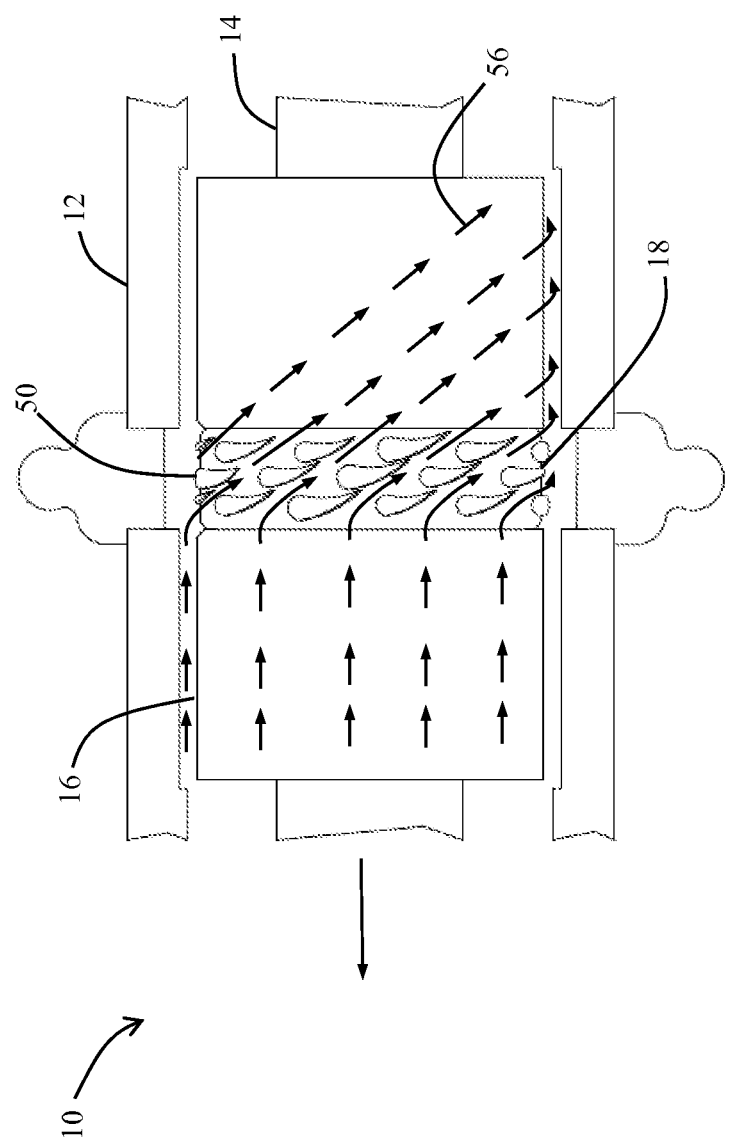
FIG. 5 is a side view of a portion of the MR damping system of FIG. 1 that illustrates a flow of MR fluid, as a piston of the MR damping system moves in a first direction, in accordance with the concepts of the present disclosure.
Figure 6:
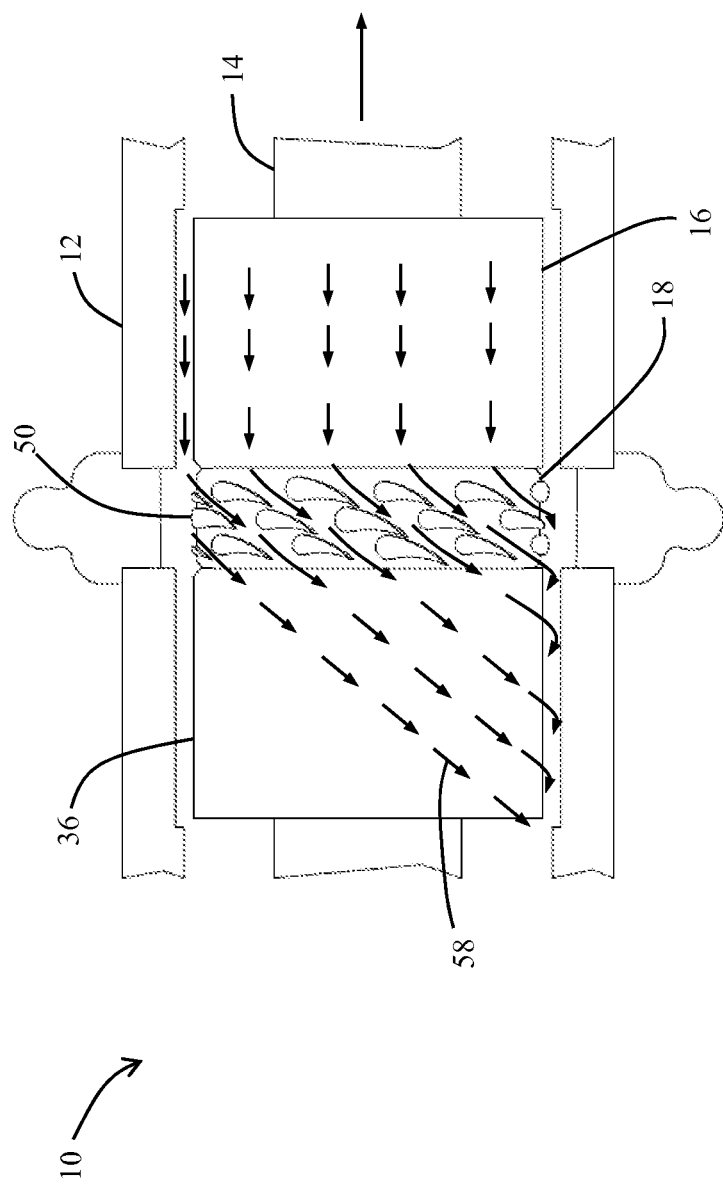
FIG. 6 is a side view of the portion of the MR damping system of FIG. 1 that illustrates flow of MR fluid in a first direction opposite to the first direction, in accordance with the concepts of the present disclosure.

In application, the first end section 26 of the shaft 14 of the MR damping system 10 is applied with a portion of the mechanical force, to facilitate damping operation. Therefore, the shaft 14 and the piston 16 reciprocates in the housing 12 in a first direction (as shown in FIG. 5) and in a second direction (as shown in FIG. 6). The flow of MR fluid during movement of the piston 16 in the first direction and the second direction is further described in FIGS. 5 & 6.

Referring to FIG. 5, there is shown a side view of the MR damping system 10 that illustrates the flow of MR fluid, during movement of the piston 16 in the first direction. As the piston 16 traverses in the first direction, MR fluid flows from the second fluid space 40 to the first fluid space 38 through the clearance space 42, along the longitudinal axis X-X. More specifically, the MR fluid flows in the second direction through the clearance space 42, as the piston 16 moves in the first direction. In the current embodiment, while the MR fluid flows through the clearance space 42 in the second direction, the flexible protrusions 50 divert the flow of MR fluid in the clockwise direction (when viewed from the second end portion 22 along the longitudinal axis X-X). A combined flow of MR fluid in the second direction and in the clockwise direction facilitates a spiral flow of MR fluid along the circumferential portion 36. Flow arrows 56, depicts the spiral flow of MR fluid, when the piston 16 traverses in the first direction. In the alternate embodiment, while the MR fluid flows through the clearance space 42, the flexible protrusions 50 divert the flow of MR fluid in the counter-clockwise direction (when viewed from the first end portion 20 along the longitudinal axis X-X). Therefore, the flexible protrusions 50 divert the flow of MR fluid about the circumferential portion 36 in one of the clockwise direction or the counter-clockwise direction, depending upon the position of the stir band 18 in the groove 44 of the piston 16.

Referring to FIG. 6, there is shown the side view of the MR damping system 10 that illustrates the flow of MR fluid, during movement of the piston 16, in the second direction. As the piston 16 traverses in the second direction, MR fluid flows from the first fluid space 38 to the second fluid space 40 through the clearance space 42, along the longitudinal axis X-X. More specifically, the MR fluid flows in the first direction through the clearance space 42, as the piston 16 moves in the second direction. In the current embodiment, while the MR fluid flows through the clearance space 42 in the first direction, the flexible protrusions 50 divert the flow of MR fluid in the clockwise direction (viewed from the second end portion 22 along the longitudinal axis X-X). A combined flow of MR fluid in the first direction and in one the clockwise direction facilitates the spiral flow of MR fluid along the circumferential portion 36. Flow arrows 58, depicts the spiral flow of MR fluid, when the piston 16 traverses in the second direction.

INDUSTRIAL APPLICABILITY

In operation, the mechanical arrangement (not shown) is applied with the mechanical force. A portion of this mechanical force is damped by the MR damping system 10. To facilitate damping, the mechanical force is applied to the first end section 26 of the shaft 14 of the MR damping system 10, along the longitudinal axis X-X. This causes the shaft 14 to reciprocate within the housing 12 and along the longitudinal axis X-X. As the piston 16 is attached to the shaft 14, the piston 16 reciprocates with the shaft 14 and within the housing 12, along the longitudinal axis X-X. The reciprocatory movement of the shaft 14 and the piston 16 may be a to-and-fro movement in the first direction and the second direction.

As the piston 16 moves in the first direction, as shown in FIG. 5, the MR fluid flows from the second fluid space 40 to the first fluid space 38, via the clearance space 42. In other words, the MR fluid passes through the clearance space 42 in the second direction, as the piston 16 moves in the first direction. This flow of MR fluid through the clearance space 42 exerts the damping force along the circumferential portion 36 in the second direction, opposite to movement of the piston 16 in the first direction. Moreover, as the MR fluid flows through the clearance space 42 in the second direction, the tail portion 54 of the flexible protrusions 50 flex in the second direction relative to the head portion 52. Therefore, the flow of MR fluid is diverted in the clockwise direction (viewed from the second end portion 22 along the longitudinal axis X-X). This causes a spiral flow of MR fluid along the circumferential portion 36 of the piston 16 and is depicted by the flow arrows 56. The flow of MR fluid in the spiral manner stirs the MR fluid and therefore stratification of MR fluid is prevented, as the piston 16 traverses in the first direction.

Conversely, as the piston 16 moves in the second direction, as shown in FIG. 6, the MR fluid flows from the first fluid space 38 to the second fluid space 40, via the clearance space 42. Therefore, as the piston 16 moves in the second direction, the flow of MR fluid is generated through the clearance space 42 in the first direction. This flow of MR fluid through the clearance space 42 exerts a damping force to the circumferential portion 36 in the first direction opposite to movement of the piston 16 in the second direction. Moreover, as the MR fluid flows through the clearance space 42, the tail portion 54 of the flexible protrusions 50 flex relative to the head portion 52 in the first direction. Therefore, the flow of MR fluid is diverted in the clockwise direction (viewed from the second end portion 22 along the longitudinal axis X-X). This causes a spiral flow of MR fluid along the circumferential portion 36 of the piston 16 and is depicted by the flow arrows 56. The flow of MR fluid in the spiral manner stirs the MR fluid and therefore stratification of MR fluid is prevented, as the piston 16 traverses in the second direction. Moreover, diversion of flow of MR fluid in the clockwise direction, during travel of the piston 16 in both of the first direction and the second direction facilitates efficient stirring of the MR fluid and prevent stratification. Therefore, the MR damping system 10 described in the present disclosure facilitates an efficient control of damping force.

It should be understood that the above description is intended for illustrative purposes only and is not intended to limit the scope of the present disclosure in any way. Those skilled in the art will appreciate that other aspects of the disclosure may be obtained from a study of the drawings, the disclosure, and the appended claim.

What is claimed is:

1. A magneto-rheological (MR) damping system for preventing stratification of MR fluid, the MR damping system comprising:
   a housing;
   a piston structured and arranged to operably reciprocate within the housing, the piston including a circumferential portion, the circumferential portion having a groove therein;
   a stir band disposed in the groove of the piston, the stir band including:
      an outer periphery;
      a plurality of flexible protrusions including:
         a head portion fixedly attached to the outer periphery of the stir band; and
         a tail portion extending from the head portion, disjointed from the outer periphery of the stir band and being substantially flexible relative to the head portion, thereby diverting a flow of MR fluid in one of a clockwise or counter-clockwise direction about the circumferential portion of the piston, during a reciprocatory movement of the piston.

* * * * *